United States Patent Office 2,856,373
Patented Oct. 14, 1958

2,856,373

POLYCAPROLACTAM MOLDING COMPOSITION AND MOLDED ARTICLES

Joseph H. Lowery, Morris Township, Morris County, N. J., and Elmer C. Schule, Parsippany-Troy Hills Township, Morris County, N. J., assignors to Allied Chemical Corporation, a corporation of New York No Drawing. Application August 6, 1956
Serial No. 602,442

4 Claims. (Cl. 260—18)

This invention relates to molding compositions and molded articles of polycaprolactam. More particularly it relates to polycaprolactam molding compositions and molded articles containing a highly purified sodium stearate mold release agent.

It has been proposed to incorporate various metallic stearates in molding compositions to promote release of the molded article from the mold. For example, in U. S. Patent 2,128,534 of August 30, 1939, to Howald, zinc stearate is cited as a lubricant to facilitate release of articles from their molds. The Howald patent points out that these lubricants or mold release agents "to be effective, should be sufficiently insoluble in the material to be molded that when the material is subjected to heat and pressure in the mold, some of the lubricant will bleed out of the material to the mold surface"; and further points out that much of the lubricant will remain in the molded object as mechanically held particles which decrease translucency of the molded object.

The present invention is based on the discovery that when sodium stearate is employed as mold release agent with, specifically, polycaprolactam, the sodium stearate functions effectively without seriously affecting the translucency of the ultimate molded article.

The principle involved in the present invention is not clear. It may be that sodium stearate dissolves in the polycaprolactam and forms a solid solution in the ultimate molded article. That would be consistent with the fact that most or all of the sodium stearate used as a mold release agent in accordance with the present invention is apparently uniformly and homogeneously dispersed in the ultimate molded article. On the other hand, the effectiveness of the sodium stearate as a mold release agent is indeed surprising, if the sodium stearate is dissolved in the polycaprolactam.

When molding compositions in accordance with this invention are subjected to high temperatures and lengthy times of exposure during molding operations, ordinary technical grade sodium stearate tends to produce discoloration in the ultimate molded article. Highly purified grades of sodium stearate, such as U. S. P. grade, produce practically negligible discoloration under the same molding conditions. Accordingly, use of such highly purified grades is preferred in accordance with this invention. The principal impurity in ordinary technical grade sodium stearate is sodium palmitate, which is the next but one lower homolog to sodium stearate. Hence the desirability of purification of the technical grade is surprising. The sodium stearate employed for purposes of the present invention should at least meet the following minimum purity specifications:

Moisture ---------------------------percent-- 1.0
Free fatty acid---------------------do----- 1.0
Free alkali ------------------------------ None
Iodine value ----------------------------- 0.8

Sodium stearate can be incorporated with polycaprolactam in a number of ways to form a molding composition in accordance with this invention. For example, powdered sodium stearate can be dry tumbled with polycaprolactam pellets, whereby the pellets become coated with sodium stearate, and in that form are ready for use in molding operations. Thorough dryness of the final polymer granules is desirable since moisture affects their melt viscosity. Accordingly in the tumbling operation a dry charge should be used and atmospheric and other moisture should be excluded, e. g., by tumbling in an atmosphere of dry gas.

Alternatively, the polycaprolactam pellets can be wetted with a hot aqueous solution of sodium stearate. Sodium stearate is adsorbed from the solution onto the pellet surface where it is strongly held—very little sodium stearate thus adsorbed can be washed off the pellets. If this solution method of incorporating sodium stearate with polycaprolactam is employed, any large quantities of carbon dioxide in the atmosphere contacting the molding composition, e. g. for drying purposes, should be avoided, so that the sodium stearate will not be converted in substantial part to sodium carbonate.

Usually the amounts of sodium stearate incorporated with polycaprolactam is the compositions of the present invention range from about 0.1% to about 0.3% by weight based on the polycaprolactam. These amounts are generally sufficient to impart the desired mold release properties to polycaprolactam pellets such as cylindrical pellets about $\frac{1}{16}''$ long and $\frac{1}{16}''$ in diameter. Larger amounts of sodium stearate can be used, up to about 0.5% by weight based on the polycaprolactam, without seriously affecting either the desirable molding properties of the polycaprolactam, including melt viscosity or the desirable properties of the ultimate polycaprolactam molded article, including strength, color, and translucency.

The following example is a complete description of a specific embodiment of molding compositions and molded articles in accordance with this invention, and of the best mode contemplated by the inventors for carrying out the invention; but the invention is not to be understood as limited to all details of the example.

*Example*

Sodium stearate was added to the polycaprolactam molding granules by dry tumbling in a double cone, end-over-end blender.

To assure perfect dryness of the blender, it was placed under vacuum 8 hours prior to addition of polymer and sodium stearate. At addition time, vacuum in the blender was broken with high purity dry nitrogen. With blender in vertical position and opening upright, a 2-inch rubber hose was extended from platform to the top opening in the blender to serve as a charge line. With inert atmosphere of high purity dry nitrogen kept in the blender, 3000 pounds of polymer granules were added through the charge line. These granules were in the form of cylinders 0.1 inch diameter x 0.1 inch high, dried to moisture content not above 0.05% by weight and packed in cans under a blanket of dry gas.

5.7 pounds of U. S. P. sodium stearate (0.19% by weight of the polymer charge) was added in increments with each 25 pounds of polymer charged. Charging time for polymer and sodium stearate was approximately 1 hour and 20 minutes. Upon completion of charge a pack-out valve was installed and inert atmosphere of high purity dry nitrogen was maintained and the blender was set to tumbling.

Blending was continued for a period of 6 hours after which the 3000 pound batch was discharged into 25 pound cans. Chemical analysis of the product for sodium stearate indicated it to be present in the concentration of 0.19% by weight; thus practically all of the sodium stearate had formed an adherent coating on the polycaprolactam.

Evaluation of mold release properties was carried out using a single cavity tumbler mold. The molded tumbler produced has an outward curving longitudinal contour, so that if poor release is encountered the tumbler will cling tightly to the male force. For this test the mold was installed in a 4 ounce vertical DeMattia press and was maintained at a temperature of 130° F. A clamp time of 30 seconds was used with the plunger time set at 15 seconds and booster pressure maintained for 3 seconds. Cylinder temperatures were set at 480° F. All tumblers released freely in the test from the male force.

Physical properties of the molded polycaprolactam containing sodium stearate were measured on injection molded tensile specimens and ½" x ¼" x 5" bars as specified for ASTM tests. These lubricated polymer samples gave values of tensile strength, elongation, tensile modulus, impact, flexural strength, compression strength, and heat distortion that were fully equal to those of the unlubricated polymer. They were also of equal clarity to that of like samples of unlubricated polycaprolactam.

When polycaprolactam containing no added lubricant is tested in the same manner as outlined above, the tumblers frequently stick in the mold with the above cycle, and require a longer cycle for their removal. Accordingly employment of the polycaprolactam-sodium stearate molding composition of our invention permits more rapid production than with a comparable unlubricated polycaprolactam.

In addition to polycaprolactam and sodium stearate, molding compositions in accordance with this invention can contain other ingredients, e. g. pigments, dyes, fillers, plasticizers, etc. In particular, a stabilizer can be present to reduce any discoloration due to the effects of heat or air on the sodium stearate ingredient of these molding compositions. Among stabilizing agents which can thus be used are the aralkylated alkoxy phenols, such as 4-methoxy phenol aralkylated with styrene or alpha-methylstyrene.

We claim:

1. A composition consisting essentially of polycaprolactam and between about 0.1% and about 0.5% by weight, based on the polycaprolactam, of sodium stearate.

2. A molding composition consisting essentially of polycaprolactam and sodium stearate in amounts between about 0.1% and about 0.3% by weight, based on the polycaprolactam, which composition is in pellet form with the sodium stearate disposed on the surface of the pellets of polycaprolactam.

3. A molding composition as defined in claim 2, wherein the sodium stearate at least meets the following minimum purity specifications:

| | |
|---|---|
| Moisture | percent 1.0 |
| Free fatty acid | do 1.0 |
| Free alkali | None |
| Iodine value | 0.8 |

4. A molded article consisting essentially of polycaprolactam and between about 0.1% and about 0.3% by weight, based on the polycaprolactam, of sodium stearate dispersed in the polycaprolactam.

References Cited in the file of this patent

UNITED STATES PATENTS

| | | |
|---|---|---|
| 1,462,563 | Voltz | July 24, 1923 |
| 2,309,729 | Gordon | Feb. 2, 1943 |